United States Patent
Ragazzi

(10) Patent No.: US 10,302,346 B2
(45) Date of Patent: May 28, 2019

(54) MAXIMIZING DEFROST MODE IN ELECTRIFIED VEHICLE HAVING DUAL EVAPORATOR AND DUAL HEATER CORE CLIMATE CONTROL SYSTEM

(71) Applicant: FORD GLOBAL TECHNOLOGIES, LLC, Dearborn, MI (US)

(72) Inventor: Franco Ragazzi, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 847 days.

(21) Appl. No.: 14/332,925

(22) Filed: Jul. 16, 2014

(65) Prior Publication Data

US 2016/0018153 A1    Jan. 21, 2016

(51) Int. Cl.
| | |
|---|---|
| *F25D 21/00* | (2006.01) |
| *F25B 30/02* | (2006.01) |
| *B60S 1/02* | (2006.01) |
| *B60H 1/00* | (2006.01) |

(52) U.S. Cl.
CPC ....... *F25D 21/002* (2013.01); *B60H 1/00392* (2013.01); *B60S 1/023* (2013.01); *F25B 30/02* (2013.01); *B60H 2001/002* (2013.01)

(58) Field of Classification Search
CPC ........ F25D 21/00; F25D 21/002; F25D 21/08; F25D 21/008; F25D 21/02; F25D 21/006; F25D 2700/02; F25D 17/065; F25D 2700/12; F25D 21/025; B60H 2001/00942; B60H 2001/00949; B60H 1/00785; B60S 1/023; B60S 1/026; B60S 1/54; B60S 1/586; F25B 30/02; F25B 2700/11; F25B 2600/23; F25B 47/025; F25B 49/02; F25B 2313/025; F25B 2312/023

USPC .................................................. 62/80, 324.1
See application file for complete search history.

(56) References Cited

U.S. PATENT DOCUMENTS

| | | | | |
|---|---|---|---|---|
| 1,998,575 | A * | 4/1935 | Furnas ................. | F25D 21/002 392/478 |
| 2,136,232 | A * | 11/1938 | Bromann, Jr. ........ | A47F 3/0404 62/257 |
| 2,498,248 | A * | 2/1950 | Chamberlain ........ | F25D 13/067 62/278 |
| 4,873,837 | A * | 10/1989 | Murray ................. | B60H 1/323 62/199 |
| 5,275,012 | A * | 1/1994 | Dage ................... | B60H 1/00392 219/202 |
| 5,419,149 | A * | 5/1995 | Hara ................... | B60H 1/00007 62/160 |
| 5,586,448 | A * | 12/1996 | Ikeda ................. | B60H 1/00392 62/156 |
| 5,842,352 | A * | 12/1998 | Gregory ................. | F25B 40/00 62/158 |
| 5,981,907 | A * | 11/1999 | Maue ...................... | H05B 3/84 116/6 |

(Continued)

FOREIGN PATENT DOCUMENTS

| | | |
|---|---|---|
| CN | 101234590 A | 8/2008 |
| KR | 20130101263 A | 9/2013 |

*Primary Examiner* — Christopher R Zerphey
(74) *Attorney, Agent, or Firm* — Carlson, Gaskey & Olds

(57) ABSTRACT

A method according to an exemplary aspect of the present disclosure includes, among other things, controlling a climate control system of an electrified vehicle by shutting off refrigerant flow to a rear portion of a heat pump subsystem in response to a defrost request.

19 Claims, 3 Drawing Sheets

(56) References Cited

U.S. PATENT DOCUMENTS

| | | | |
|---|---|---|---|
| 6,178,760 B1* | 1/2001 | Tanaka | B60H 1/00392 62/154 |
| 6,237,357 B1 | 5/2001 | Hirao et al. | |
| 6,330,909 B1 | 12/2001 | Takahashi et al. | |
| 6,347,528 B1* | 2/2002 | Iritani | B60H 1/00357 62/323.1 |
| 6,516,621 B2 | 2/2003 | Homan et al. | |
| 6,640,570 B2* | 11/2003 | Nishida | B60H 1/00064 165/42 |
| 6,675,595 B2 | 1/2004 | Ohya | |
| 6,820,436 B2* | 11/2004 | Tomita | B60H 1/005 62/133 |
| 6,898,946 B2* | 5/2005 | Ogiso | B60H 1/00064 62/200 |
| 6,983,793 B2* | 1/2006 | Zheng | B60H 1/00885 165/203 |
| 7,066,245 B2 | 6/2006 | Ebara et al. | |
| 7,140,427 B2 | 11/2006 | Honda et al. | |
| 7,150,158 B2* | 12/2006 | Morita | B60H 1/00792 62/156 |
| 7,201,010 B2* | 4/2007 | Homan | B60H 1/004 62/228.4 |
| 7,325,595 B2* | 2/2008 | Homan | B60H 1/004 165/202 |
| 7,370,487 B2* | 5/2008 | Hayashi | F25B 31/004 62/157 |
| 7,461,515 B2* | 12/2008 | Wellman | F25B 47/022 137/315.33 |
| 8,209,073 B2 | 6/2012 | Wijaya et al. | |
| 8,301,335 B2* | 10/2012 | Hill | G05B 13/021 165/202 |
| 8,302,417 B2 | 11/2012 | Major et al. | |
| 8,371,512 B2* | 2/2013 | Douarre | B60H 1/00278 237/12.1 |
| 8,419,512 B2* | 4/2013 | Creed | B60H 1/00207 454/139 |
| 8,474,276 B2* | 7/2013 | Nelson | F01K 25/106 62/112 |
| 9,102,214 B2* | 8/2015 | Kishi | B60H 1/008 |
| 9,188,350 B2* | 11/2015 | Choi | B60H 1/00 |
| 9,188,380 B2* | 11/2015 | Lu | G05D 23/00 |
| 2003/0080714 A1* | 5/2003 | Inoue | B60H 1/00278 320/150 |
| 2004/0074246 A1* | 4/2004 | Kurata | B60H 1/00328 62/196.4 |
| 2005/0052080 A1* | 3/2005 | Maslov | B60L 8/00 307/10.1 |
| 2005/0210900 A1* | 9/2005 | Oomura | B60H 1/3214 62/228.1 |
| 2005/0241818 A1* | 11/2005 | Yakumaru | B60H 1/004 165/202 |
| 2006/0086496 A1* | 4/2006 | Gavula | F25B 13/00 165/299 |
| 2006/0225450 A1* | 10/2006 | Dage | B60H 1/004 62/323.1 |
| 2007/0130974 A1* | 6/2007 | Gatlin | F25D 21/006 62/227 |
| 2007/0137238 A1* | 6/2007 | Hu | F25B 5/02 62/277 |
| 2009/0139781 A1* | 6/2009 | Straubel | B60L 11/1875 180/65.1 |
| 2009/0173092 A1* | 7/2009 | Hu | F25B 5/02 62/151 |
| 2009/0283604 A1* | 11/2009 | Martinchick | B60H 1/034 237/12.3 B |
| 2009/0301112 A1* | 12/2009 | Nelson | F01K 25/106 62/112 |
| 2011/0153140 A1 | 6/2011 | Datta et al. | |
| 2011/0209494 A1* | 9/2011 | Nelson | F01K 25/106 62/434 |
| 2012/0234930 A1* | 9/2012 | Wijaya | G08C 17/00 236/51 |
| 2013/0019615 A1* | 1/2013 | Choi | B60H 1/00 62/79 |
| 2013/0313031 A1* | 11/2013 | Porras | F01N 9/00 180/65.21 |
| 2014/0026600 A1* | 1/2014 | Wippler | B60H 1/00785 62/80 |
| 2014/0070606 A1* | 3/2014 | Gibeau | B60L 11/1862 307/9.1 |
| 2014/0114514 A1* | 4/2014 | Crombez | B60W 10/06 701/22 |
| 2014/0144160 A1* | 5/2014 | Jackson | H01M 10/5004 62/62 |
| 2014/0163798 A1* | 6/2014 | Ross | B60W 30/182 701/22 |
| 2014/0338376 A1* | 11/2014 | Carpenter | B60L 1/003 62/115 |

* cited by examiner

MAXIMIZING DEFROST MODE IN
ELECTRIFIED VEHICLE HAVING DUAL
EVAPORATOR AND DUAL HEATER CORE
CLIMATE CONTROL SYSTEM

TECHNICAL FIELD

This disclosure relates to methods and systems for maximizing defrost functionality of an electrified vehicle equipped with a climate control system that employs dual evaporators and dual heater cores. During certain conditions, the climate control system can be controlled by shutting off refrigerant flow to a portion of a heat pump subsystem in response to a defrost request.

BACKGROUND

Electrified vehicles, such as hybrid electric vehicles (HEV's), plug-in hybrid electric vehicles (PHEV's), battery electric vehicles (BEV's), or fuel cell vehicles differ from conventional motor vehicles because they are powered by electric machines (i.e., electric motors and/or generators) instead of or in addition to an internal combustion engine. High voltage current for powering these types of electric machines is typically supplied by one or more high voltage battery assemblies.

Some electrified vehicles are equipped with a climate control system that employs a heat pump subsystem for warming, cooling and/or dehumidifying a passenger cabin. For example, the heat pump subsystem can be operated in a heating mode in which the passenger cabin is heated, a cooling mode in which the passenger cabin is cooled, and a dehumidification mode in which a vehicle windshield defrost function is supported. It is desirable to improve operation of the climate control system during certain conditions.

SUMMARY

A method according to an exemplary aspect of the present disclosure includes, among other things, controlling a climate control system of an electrified vehicle by shutting off refrigerant flow to a rear portion of a heat pump subsystem in response to a defrost request.

In a further non-limiting embodiment of the foregoing method, the controlling step is performed if the electrified vehicle is operating in EV mode.

In a further non-limiting embodiment of either of the foregoing methods, the controlling step is performed if a fuel level of the electrified vehicle is below a predefined threshold.

In a further non-limiting embodiment of any of the foregoing methods, the method includes closing an expansion valve to shut off the refrigerant flow to the rear portion.

In a further non-limiting embodiment of any of the foregoing methods, the rear portion includes a rear evaporator of the heat pump subsystem.

In a further non-limiting embodiment of any of the foregoing methods, the method includes shutting off coolant flow to a portion of a coolant subsystem in response to the defrost request.

In a further non-limiting embodiment of any of the foregoing methods, the method includes closing a valve to shut off the coolant flow to the portion. The portion includes a rear heater core of the coolant subsystem.

In a further non-limiting embodiment of any of the foregoing methods, the method includes turning off a blower of a rear housing of a ventilation subsystem in response to the defrost request.

In a further non-limiting embodiment of any of the foregoing methods, the controlling step includes commanding operation of the heat pump subsystem in dehumidification mode in response to the defrost request if the electrified vehicle is operating in EV mode and a fuel level of the electrified vehicle is below a predefined threshold.

In a further non-limiting embodiment of any of the foregoing methods, the heat pump subsystem is a dual evaporator/dual heater core vapor compression heat pump system.

A method according to another exemplary aspect of the present disclosure includes, among other things, operating a heat pump subsystem of a climate control system of an electrified vehicle in a dehumidification mode and shutting off refrigerant flow to an evaporator of the heat pump subsystem if a defrost request has been made.

In a further non-limiting embodiment of the foregoing methods, the operating step and the shutting off step are performed if the electrified vehicle is operating in EV mode and a fuel level of the electrified vehicle is below a predefined threshold.

In a further non-limiting embodiment of either of the foregoing methods, the heat pump subsystem is a dual evaporator/dual heater core vapor compression heat pump system.

In a further non-limiting embodiment of any of the foregoing methods, the method includes actuating an expansion valve to shut off the refrigerant flow.

In a further non-limiting embodiment of any of the foregoing methods, the method includes at least one of shutting off coolant flow to a heater core of a coolant subsystem of the climate control system and turning off a blower of a ventilation subsystem of the climate control system.

A climate control system according to another exemplary aspect of the present disclosure includes, among other things, a heat pump subsystem configured to circulate a refrigerant. The heat pump subsystem includes a front evaporator, a rear evaporator and an expansion valve adapted to shut off flow of the refrigerant to the rear evaporator in response to a defrost request.

In a further non-limiting embodiment of the foregoing system, a controller is configured to control operation of the expansion valve.

In a further non-limiting embodiment of either of the foregoing systems, a coolant subsystem is configured to circulate a coolant for cooling an engine. The coolant subsystem includes a front heater core, a rear heater core, and a valve adapted to shut off flow of the coolant to the rear heater core in response to the defrost request.

In a further non-limiting embodiment of any of the foregoing systems, an intermediate heat exchanger is adapted to effectuate heat transfer between the refrigerant and the coolant.

In a further non-limiting embodiment of any of the foregoing systems, a ventilation subsystem includes a front housing that houses the front evaporator and a rear housing that houses the rear evaporator.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to improving the defrost functionality of an electrified vehicle equipped with a climate control system employing dual evaporators and dual heater cores. The climate control system may be controlled by shutting off refrigerant flow to a portion of a heat pump system and/or a portion of a coolant subsystem in response to a defrost request. In some embodiments, defrost operation is maximized in situations where the electrified vehicle is operating in EV mode, fuel level is below a predefined threshold, and a defrost request has been made. These and other features are discussed in greater detail in the paragraphs that follow.

Figure 1:
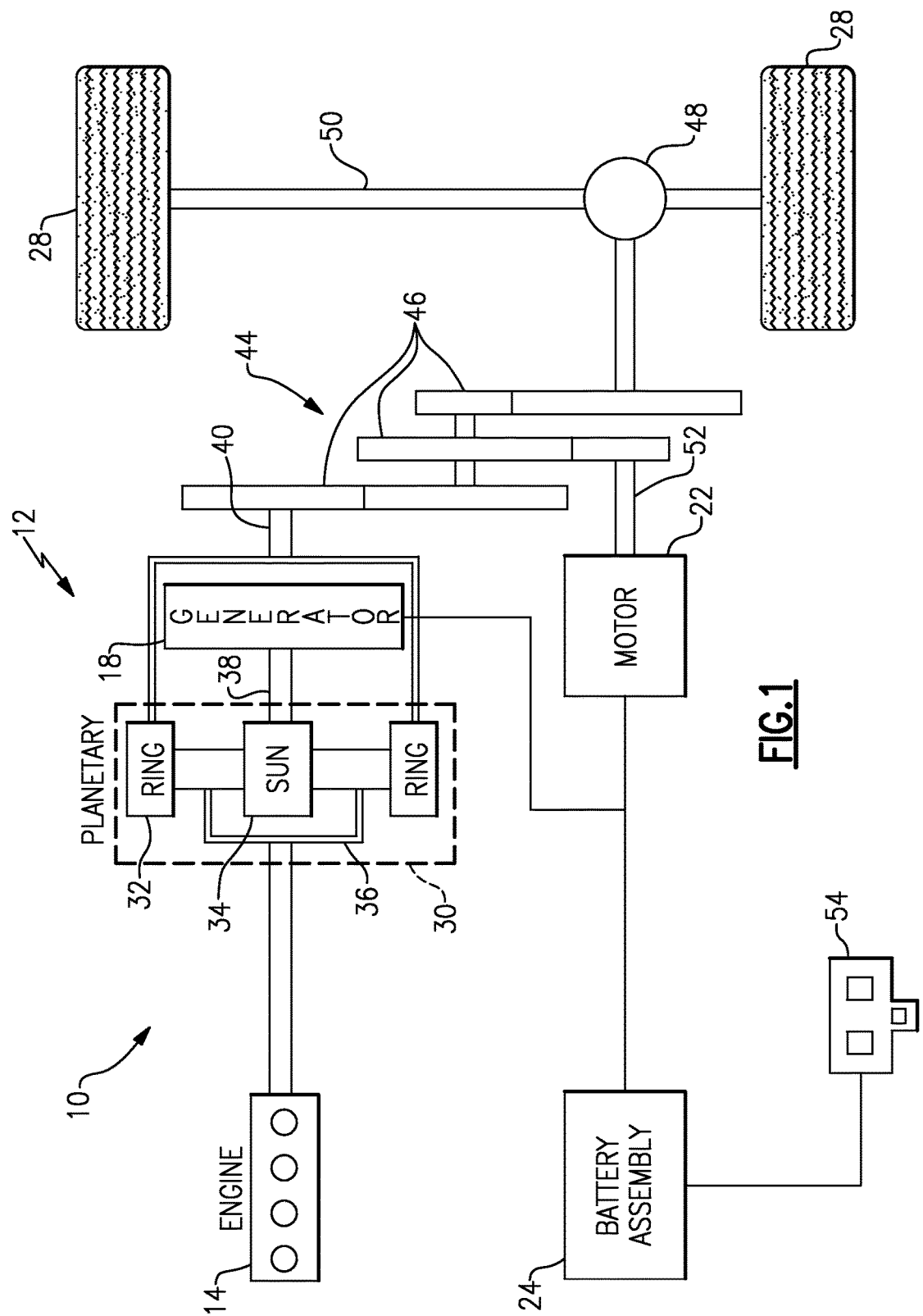
FIG. 1 schematically illustrates the powertrain of an electrified vehicle.

FIG. 1 schematically illustrates a powertrain 10 of an electrified vehicle 12. Although depicted as a PHEV in this embodiment, it should be understood that the concepts described herein are not limited to PHEV's and could extend to other electrified vehicles, including, but not limited to, HEV's and BEV's.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery assembly. The battery assembly 24 may include a high voltage battery pack that is capable of outputting electrical power to operate the motor 22 and the generator 18. Other types of energy storage devices and/or output devices can also be used to electrically power the electrified vehicle 12.

In a non-limiting PHEV embodiment of the electrified vehicle 12, the battery assembly 24 may be recharged or partially recharged using a charging adapter 54 that is connected to a charging station powered by an external power source, such as an electrical grid, a solar panel, or the like.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally not permitted to operate under a default EV mode but could be operated as necessary based on a vehicle system state or as permitted by the operator.

The electrified vehicle 12 may additionally be operated in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes.

Figure 2:
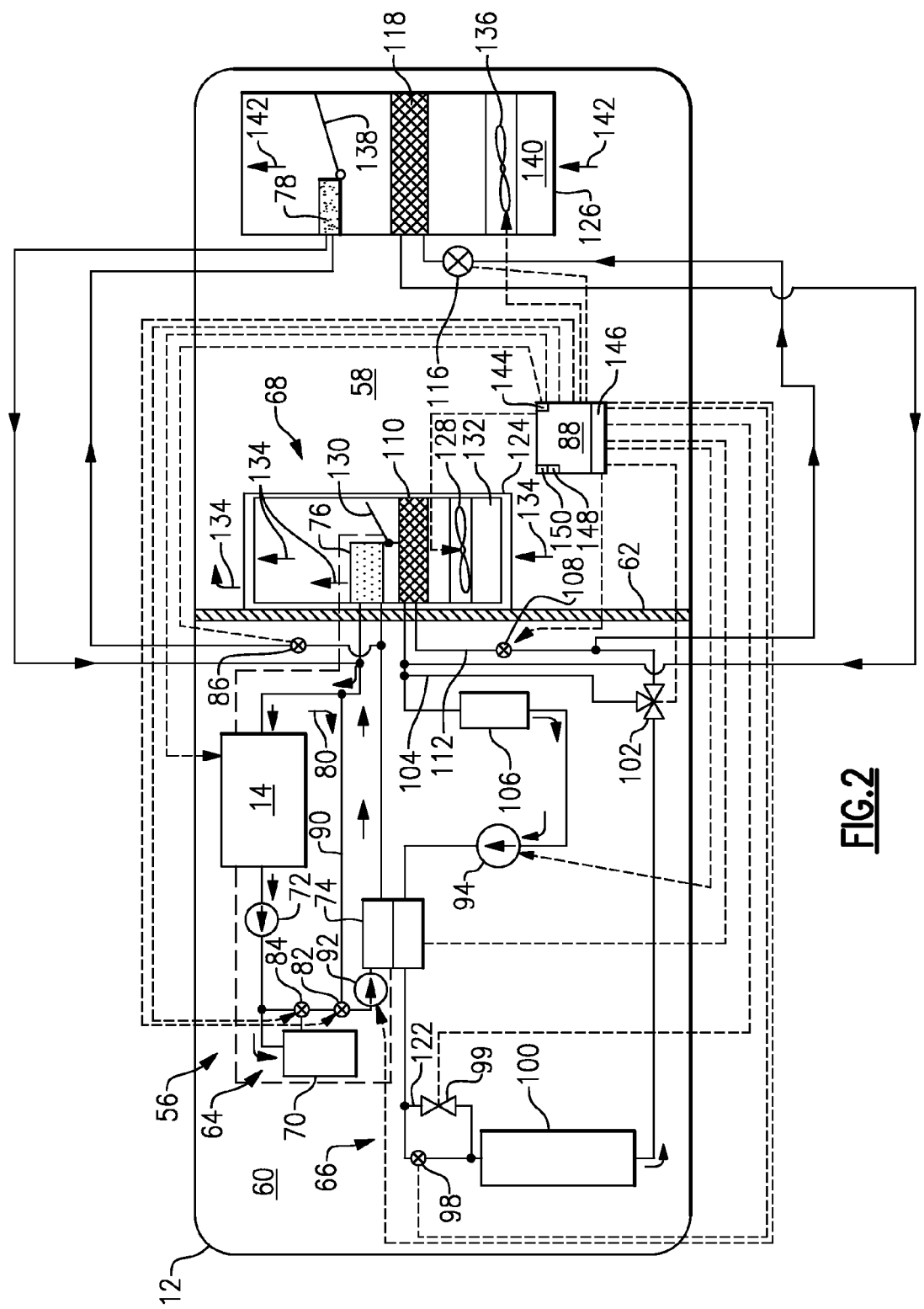
FIG. 2 schematically illustrates a climate control system of an electrified vehicle.

FIG. 2 illustrates a climate control system 56 of an electrified vehicle, such as the electrified vehicle 12 of FIG. 1. However, this disclosure extends to other electrified vehicles and is not limited to the specific configuration shown in FIG. 1. In FIG. 2, devices and fluidic passages or conduits are shown in solid lines, and electrical connections are shown as dashed lines.

In one embodiment, the electrified vehicle 12 includes a passenger compartment 58, an engine compartment 60, and the climate control system 56. The passenger compartment 58 may be located inside the electrified vehicle 12 and can receive one or more occupants. A portion of the climate control system 56 may be disposed within the passenger compartment 58.

Engine compartment 60 is positioned proximate to the passenger compartment 58. One or more power sources, such as an internal combustion engine 14, as well as a portion of the climate control system 56 may be housed within the engine compartment 60. The engine compartment 60 may be isolated from the passenger compartment 58 via a bulkhead 62. The climate control system 56 can circulate air and/or control or modify the temperature of air that is circulated in the passenger compartment 58. The internal combustion engine 14 can also be thermally managed by the climate control system 56 to reduce fuel consumption and emissions.

The climate control system 56 may include a coolant subsystem 64, a heat pump subsystem 66, and a ventilation subsystem 68. Each of these systems is described in detail below.

The coolant subsystem 64, or coolant loop, may circulate a coolant, such as glycol, to cool the engine 14. For example, waste heat generated by the engine 14 when the engine is operational may be transferred to the coolant and then circulated to a radiator 70 to cool the engine 14. In one embodiment, the coolant subsystem 64 includes a coolant pump 72, an intermediate heat exchanger 74, a front heater core 76, a rear heater core 78, and a bypass loop 80 that may be fluidly interconnected by conduits or passages such as tubes, hoses, pipes and/or the like. The radiator 70 transfers thermal energy from the coolant to the ambient air surrounding the electrified vehicle 12.

The coolant subsystem 64 may additionally include valves 82, 84 and 86 for selectively adjusting the flow of coolant through the engine 14, the radiator 70, the intermediate heat exchanger 74, the front heater core 76, and/or the rear heater core 78. In one embodiment, the valves 82, 84 and 86 are electrically operated valves that are selectively actuated via a controller 88. Other types of valves could alternatively be utilized within the coolant subsystem 64.

In operation, the coolant pump 72 circulates coolant through the coolant subsystem 64. The coolant pump 72 may be powered by electrical or non-electrical power sources. For example, the coolant pump 72 could be operatively coupled to the engine 14, or could be driven by an electrically powered motor. The coolant pump 72 receives coolant from the engine 14 and circulates the coolant in a closed loop. For example, when the climate control system 56 is operating in a heating mode, coolant may be routed from the coolant pump 72 to the intermediate heat exchanger 74, thereby bypassing the radiator 70, and then to the front heater core 76 and/or the rear heater core 78 before returning to the engine 14. When the engine 14 is outputting relatively high levels of thermal energy, coolant may flow from the coolant pump 72 to the radiator 70 before returning to the engine 14 via the intermediate heat exchanger 74 and the front heater core 76 and/or the rear heater core 78. The valve 84 directs coolant from the coolant pump 72 either through the radiator 70 or around the radiator 70 to the valve 82. Coolant may flow through or around the engine 14 based on the position of the valve 82.

The intermediate heat exchanger 74 may facilitate the transfer of thermal energy between the coolant subsystem 64 and the heat pump subsystem 66. For example, heat may be transferred from the heat pump subsystem 66 to the coolant subsystem 64 or visa-versa. In one embodiment, the intermediate heat exchanger 74 is disposed as part of both the coolant subsystem 64 and the heat pump subsystem 66. The intermediate heat exchanger 74 can include any suitable configuration. For example, the intermediate heat exchanger 74 may have a plate-fin, tube-fin, or tube-and-shell configuration that facilitates the transfer of thermal energy between the heat pump subsystem 66 and the coolant subsystem 64 without mixing or exchanging the heat transfer fluids of these systems.

In some conditions, the front heater core 76 and the rear heater core 78 may transfer thermal energy from the engine coolant to air in the passenger compartment 58. The front heater core 76 and the rear heater core 78 are located at different locations within the passenger compartment 58 in different sections of the ventilation subsystem 68 and could embody any suitable configuration. In one embodiment, the front and rear heater cores 76, 78 are configured as plate-fin or tube-fin heat exchangers. However, other heater core configurations are contemplated as within the scope of this disclosure.

The bypass loop 80 routes coolant in such a way that it is not heated by the engine 14. The valve 82 may control the flow of coolant through the bypass loop 80. For example, when in a first position, the valve 82 may prevent coolant from flowing through a bypass line 90 and inhibit the flow of coolant from the engine 14 to the intermediate heat exchanger 74. In such a position, a second coolant pump 92 may circulate coolant through the bypass loop 80 from the intermediate heat exchanger 74 to the front and rear heater cores 76, 78, then to the bypass line 90, and back to the second coolant pump 92. As such, the coolant in the coolant subsystem 64 may be heated independently by the heat pump subsystem 66 via the intermediate heat exchanger 74. The valve 82 may also inhibit the flow of coolant through the bypass line 90 when positioned in a second position. The second coolant pump 92 may or may not circulate coolant when coolant does not flow through the bypass line 90.

The heat pump subsystem 66, or refrigerant loop, may circulate a refrigerant to transfer thermal energy to or from the passenger compartment 58 and to or from the coolant subsystem 64. In one embodiment, the heat pump subsystem 66 is configured as a dual evaporator/dual heater core vapor compression heat pump system in which a fluid, such as refrigerant, is circulated through the heat pump subsystem 66 to transfer thermal energy to or from the passenger compartment 58.

The heat pump subsystem 66 may be controlled to operate in various modes, including but not limited to, a cooling mode, a heating mode, and a dehumidification mode. In the cooling mode, the heat pump subsystem 66 may circulate refrigerant to transfer thermal energy from inside the passenger compartment 58 to outside the passenger compartment 58. In a heating mode, the heat pump subsystem 66 may transfer thermal energy from the refrigerant to the coolant of the coolant subsystem 64 via the intermediate heat exchanger 74 without circulating the refrigerant through any heat exchanger located in the passenger compartment 58. In dehumidification mode, the heat pump subsystem 66 may be operated to remove humidity from the passenger compartment 58 and provide heat to the coolant subsystem 64 via intermediate heat exchanger 74, such as to defrost a windshield of the electrified vehicle 12, for example.

In one embodiment, the heat pump subsystem 66 includes a compressor 94, the intermediate heat exchanger 74, a first expansion device 98, a solenoid valve 99, an outside heat exchanger 100, a three-way valve 102, an accumulator 106, a second expansion device 108, a front evaporator 110, a third expansion device 116, and a rear evaporator 118. Components of the heat pump subsystem 66 may be in fluidic communication via one or more conduits, such as tubes, hoses or the like.

The compressor 94 pressurizes and circulates the refrigerant through the heat pump subsystem 66. The compressor 94 may be powered by an electrical or non-electrical power source. For example, the compressor 94 may be operatively coupled to the engine 14 or driven by an electrically powered motor. In the heating mode of the climate control system 56, the compressor 94 directs high pressure refrigerant to the intermediate heat exchanger 74, which in turn may transfer heat from the high pressure refrigerant to coolant passing through the intermediate heat exchanger 74 to heat the coolant of the coolant subsystem 64.

The first expansion device 98 is positioned between and in fluidic communication with both the intermediate heat exchanger 74 and the outside heat exchanger 100. The first expansion device 98 is adapted to change the pressure of the refrigerant of the heat pump subsystem 66. For example, the first expansion device 98 may be an electronic expansion valve, a thermal expansion valve (TXV) or a fixed area valve, such as a fixed orifice tube, that may or may not be externally controlled. The first expansion device 98 may reduce the pressure of the refrigerant that passes through the first expansion device 98 from the intermediate heat exchanger 74 to the outside heat exchanger 100. Therefore, high pressure refrigerant received from the intermediate heat exchanger 74 may exit the first expansion device 98 at a lower pressure and as a liquid and vapor mixture in the heating mode.

The solenoid valve 99 may be positioned in a bypass line 122 that permits a portion of the refrigerant to bypass the first expansion device 98. The solenoid valve 99 may be opened during cooling mode and closed during heating mode. When opened, a majority of the refrigerant flow is passed through the solenoid valve 99 since it provides the path of least resistance. When the solenoid valve 99 is closed, all refrigerant flow is passed through the first expansion device 98 to meter the refrigerant flow into the outside heat exchanger 100.

The outside heat exchanger 100 may be positioned within the engine compartment 60. In the cooling mode or air conditioning context, the outside heat exchanger 100 may function as a condenser to transfer heat to the surrounding environment by condensing the refrigerant from a vapor to a liquid. In the heating mode, the outside heat exchanger 100 may function as an evaporator to transfer heat from the surrounding environment to the refrigerant, thereby causing the refrigerant to vaporize.

The three-way valve 102 may be positioned between the outside heat exchanger 100 and both the accumulator 106 and the evaporator 110. The three-way valve 102 can control the flow of refrigerant that exits the outside heat exchanger 100. In the heating mode, the three-way valve 102 is actuated to permit refrigerant to flow from the outside heat exchanger 100 to the accumulator 106 along a bypass line 104, thereby bypassing flow through the evaporator 110. The three-way valve 102 may alternatively be positioned to permit flow of the refrigerant to the evaporator 110 along line 112, such as during the cooling mode.

The accumulator 106 acts as a reservoir for storing any residual liquid refrigerant so that vapor refrigerant rather than liquid refrigerant is provided to the compressor 94. The accumulator 106 includes a desiccant that absorbs relatively small amounts of water moisture from the refrigerant.

The second expansion device 108 may be positioned between and in fluid communication with the outside heat exchanger 100 and the front evaporator 110. The third expansion device 116 may be positioned between and in fluid communication with the outside heat exchanger 100 and the rear evaporator 118. The second and third expansion devices 108, 116 may have a similar structure as the first expansion device 98 and are configured to change the pressure of the refrigerant similar to the first expansion device 98. In one embodiment, the second expansion device 108 is closed to inhibit the flow of refrigerant from the outside heat exchanger 100 to the front evaporator 110 in the heating mode. The third expansion device 116 may also be closed to inhibit the flow of refrigerant through the rear evaporator 118 during certain conditions.

The front evaporator 110 is fluidly connected to the second expansion device 108. The front evaporator 110 may be positioned inside the passenger compartment 58. In the cooling mode, the front evaporator 110 receives heat from air in the passenger compartment 58 to vaporize the refrigerant. Refrigerant exiting the front evaporator 110 is routed to the accumulator 106. In the heating mode, the three-way valve 102 the refrigerant to the accumulator 106, bypassing the front evaporator 110.

The rear evaporator 118 may be positioned inside the passenger compartment 58, such as relative to third row seating of the electrified vehicle 12. In the cooling mode, the rear evaporator 118 receives heat from air in the passenger compartment 58 to vaporize the refrigerant. Refrigerant exiting the rear evaporator 118 is routed to the accumulator 106. In the heating mode, the refrigerant is not routed to the rear evaporator 118 because the third expansion device 116 is closed.

The ventilation subsystem 68 may circulate air in the passenger compartment 58. In one embodiment, the ventilation subsystem 68 includes a front housing 124 and a rear housing 126. For example, the front housing 124 may be positioned under an instrument panel of the electrified vehicle 12 for circulating air in front portions of the passenger compartment 58, whereas the rear housing 126 may be positioned relative to third row seating of the electrified vehicle 12 for circulating air in rear portions of the passenger compartment 58.

The front housing 124 of the ventilation subsystem 68 may house a blower 128 and a temperature door 130. An air intake portion 132 may receive air 134 from outside the electrified vehicle 12 and/or air from inside the passenger compartment 58. For example, the air intake portion 132 may receive ambient air from outside the electrified vehicle 12 via an intake passage, duct or opening that is located in any suitable location, such as proximate a cowl, wheel well, or other vehicle body panel. The air intake portion 132 may also receive air from inside the passenger compartment 58 and recirculate this air through the ventilation subsystem 68. One or more doors or louvers may also be provided to permit or inhibit air circulation.

The blower 128, also called a blower fan, is positioned near the air intake portion 132 and can be configured as a centrifugal fan that circulates air through the front housing 124 of the ventilation subsystem 68.

In one embodiment, the temperature door 130 is positioned between the front evaporator 110 and the front heater core 76 and may be positioned downstream of the front evaporator 110 and upstream of the front heater core 76. The temperature door 130 blocks or permits the flow of air 134 through the front heater core 76 to help control the temperature of air in the passenger compartment 58. For example, the temperature door 130 may permit airflow through the front heater core 76 in the heating mode such that heat may be transferred from the coolant to air passing through the front heater core 76. This heated air may then be provided to a plenum for distribution to ducts and vents or outlets located in the passenger compartment 58. The temperature door 130 may be moved between a plurality of positions to provide air having a desired temperature. In the embodiment of FIG. 2, the temperature door 130 is shown in a full heat position in which the flow of air 134 is directed through the front heater core 76.

The rear housing 126 may also house a blower 136 and a temperature door 138. An air intake portion 140 may receive air 142 from inside the passenger compartment 58. One or more doors or louvers may also be provided to permit or inhibit circulation of the air 142. The blower 136 circulates the air 142 through the rear housing 126 of the ventilation subsystem 68. The temperature door 138 blocks or permits the flow of air 142 through the rear heater core 78 to help control the temperature of air in the passenger compartment 58.

The climate control system 56 may additionally be operated in a dehumidification mode to remove humidity from the passenger compartment 58. Operating the climate control system 56, and in particular the heat pump subsystem 66, in dehumidification mode supports windshield defrosting functions of the electrified vehicle 12. Under normal operating conditions, the heat pump subsystem 66 is operated in dehumidification mode in which the outside heat exchanger 100 and the front and rear evaporators 110, 118 receive refrigerant. In dehumidification mode, the first expansion device 98 is opened, the solenoid valve 99 is closed, and the second and third expansion devices 108, 116 are opened.

The controller 88 may be part of an overall vehicle control unit, such as a vehicle system controller (VSC), or could alternatively be a stand-alone control unit separate from the VSC. In one embodiment, the controller 88 includes executable instructions for interfacing with and operating the various components of the climate control system 56. The controller 88 may include inputs 144 and outputs 146 for interfacing with the various components of the climate control system 56. The controller 88 may also include a central processing unit 148 and non-transitory memory 150 for executing the various control strategies and modes of the climate control system 56.

Figure 3:
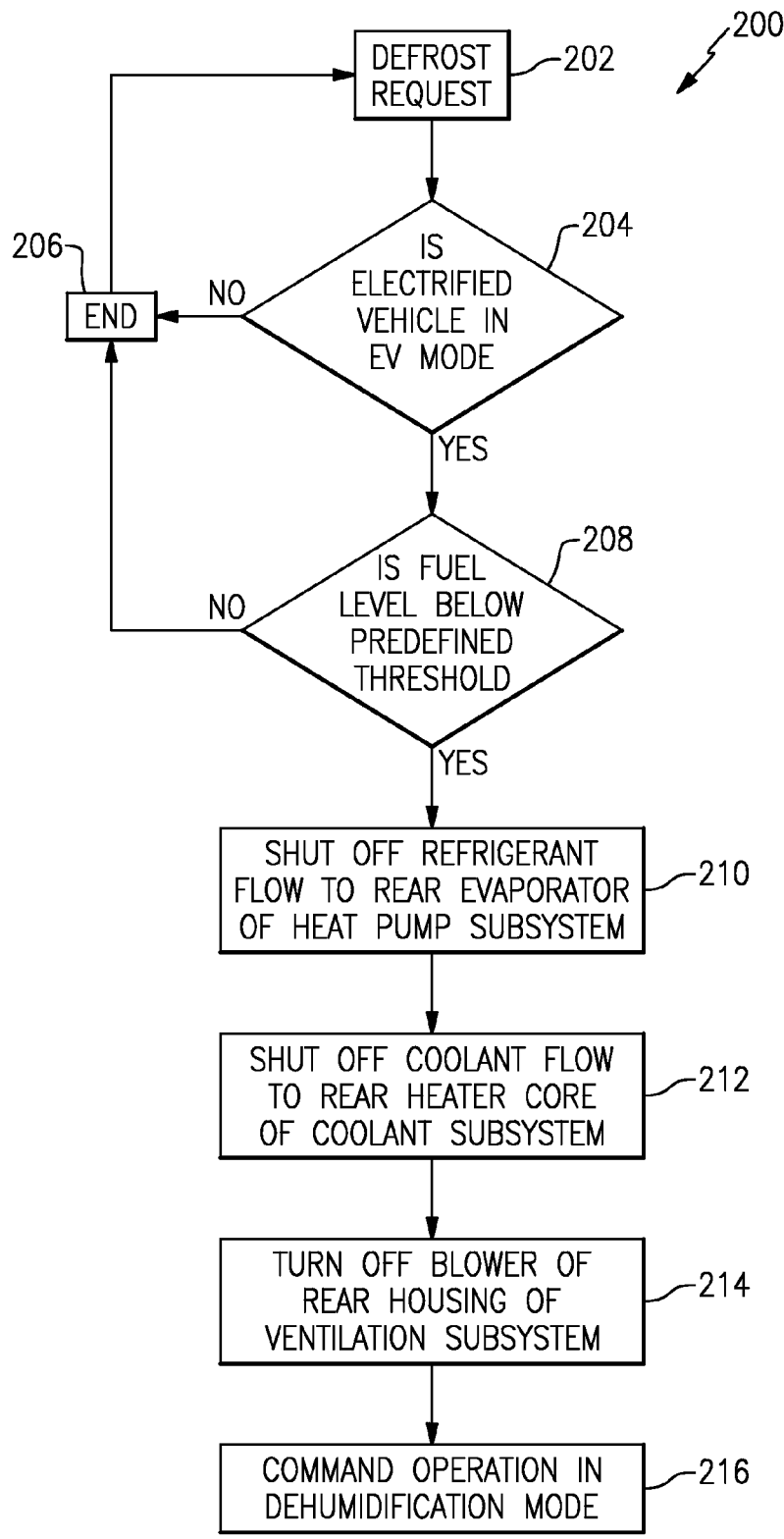
FIG. 3 schematically illustrates a control strategy for controlling a climate control system of an electrified vehicle.

FIG. 3, with continued reference to FIGS. 1 and 2, schematically illustrates a control strategy 200 for controlling operation of the climate control system 56 of the electrified vehicle 12. For example, the control strategy 200 may be executed during certain conditions to maximize operation of a windshield defrost function of the electrified vehicle 12. Of course, the electrified vehicle 12 is capable of implementing and executing other control strategies within the scope of this disclosure. In one embodiment, the controller 88 of the climate control system 56 is programmed with one or more algorithms adapted to execute the control strategy 200, or any other control strategy. In other words, the control strategy 200 may be stored as executable instructions in the non-transitory memory 150 of the controller 88.

As shown in FIG. 3, the control strategy 200 may begin at block 202 in response to a defrost request. An occupant may perform a defrost request by actuating a defrost button, knob or other input of a climate control instrument panel located within the passenger compartment 58 and which is in electrical communication with the controller 88. A defrost request indicates to the controller 88 that the heat pump subsystem 66 should be operated in dehumidification mode (either series or parallel) in order to defrost a windshield or other window of the electrified vehicle 12.

The control strategy 200 initiates a series of system checks before initiating dehumidification mode. For example, at block 204, the control strategy 200 may determine whether the electrified vehicle 12 is operating in EV mode. If the electrified vehicle 12 is not operating in EV mode, the control strategy ends at block 206. However, if it is determined that the electrified vehicle 12 is operating in EV mode, the control strategy 200 may proceed to block 208.

At block 208, the control strategy 200 may determine whether the fuel level of the engine 14 is below a predefined threshold. For example, a fuel tank that holds fuel for powering the engine 14 may include a sensor for determining the amount of fuel held by the tank. In one embodiment, the sensed fuel level may be compared against a threshold fuel level value that is stored on the controller 88. The control strategy 200 ends at block 206 if it is determined that the fuel level is not below the predefined threshold.

The control strategy 200 can proceed to block 210 if the fuel level is below a predefined threshold. Refrigerant flow to the rear evaporator 118 of the heat pump subsystem 66 may be shut off at block 210. In one embodiment, the third expansion device 116 is actuated (i.e., closed) to block refrigerant flow through the rear evaporator 118.

Optionally, at block 212, coolant flow to the rear heater core 78 of the coolant subsystem 64 may be shut off if the electrified vehicle 12 is operating in EV mode and has a fuel level below a predefined threshold. In one embodiment, coolant flow to the rear heater core 78 is blocked by closing the valve 86. The blower 136 of the rear housing 126 of the ventilation subsystem 68 may also optionally be turned off at block 214 in response to a defrost request, operation in EV mode and a fuel level below a predefined threshold.

Finally, at block 216, the control strategy 200 may command operation of the climate control system 56 in dehumidification mode. By operating the climate control system 56 in dehumidification mode after closing the third expansion device 116 and/or the valve 86 in response to a defrost request, the defrost function of the electrified vehicle 12 can be maximized even during conditions where its operation might otherwise be less than optimal.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

We claim:

1. A method for controlling a climate control system of an electrified vehicle configured to operate in an EV mode in which an electric machine is operated without assistance from an engine to propel the electrified vehicle and configured to operate in a non-EV mode, the method comprising:
shutting off a refrigerant flow to a rear evaporator of a heat pump subsystem in response to a window defrost request during the EV mode,
wherein the heat pump subsystem includes a front evaporator, the rear evaporator, and an expansion device adapted to shut off the refrigerant flow in response to the window defrost request,
wherein the window defrost request indicates that the heat pump subsystem should be operated in a dehumidification mode to defrost a windshield of the electrified vehicle.

2. The method as recited in claim 1, wherein the controlling step is performed when a fuel level of the electrified vehicle is below a predefined threshold.

3. The method as recited in claim 1, comprising closing the expansion device to shut off the refrigerant flow to the rear portion.

4. The method as recited in claim 1, comprising shutting off coolant flow to a portion of a coolant subsystem in response to the window defrost request.

5. The method as recited in claim 4, comprising closing a valve to shut off the coolant flow to the portion, wherein the portion includes a rear heater core of the coolant subsystem.

6. The method as recited in claim 1, comprising turning off a blower of a rear housing of a ventilation subsystem in response to the window defrost request.

7. The method as recited in claim 1, wherein the controlling step includes commanding operation of the heat pump subsystem in the dehumidification mode in response to the window defrost request when the electrified vehicle is operating in the EV mode and a fuel level of the electrified vehicle is below a predefined threshold.

8. The method as recited in claim 1, wherein the heat pump subsystem is a dual evaporator/dual heater core vapor compression heat pump system.

9. A method for controlling a climate control system of an electrified vehicle configured to operate in an EV mode in which an electric machine is operated without assistance from an engine to propel the electrified vehicle and configured to operate in a non-EV mode, the method comprising:
shutting off a refrigerant flow to a rear evaporator of a heat pump subsystem of the climate control system in response to a window defrost request during the EV mode,
wherein the heat pump subsystem includes a front evaporator, the rear evaporator, and an expansion device adapted to shut of the refrigerant flow in response to the window defrost request; and
after shutting off the refrigerant flow, operating the heat pump subsystem in a dehumidification mode to defrost a window of the electrified vehicle.

10. The method as recited in claim 9, wherein the operating step and the shutting off step are performed in response to the electrified vehicle operating in the EV mode and a fuel level of the electrified vehicle being below a predefined threshold.

11. The method as recited in claim 9, wherein the heat pump subsystem is a dual evaporator/dual heater core vapor compression heat pump system.

12. The method as recited in claim 9, comprising actuating the expansion device to shut off the refrigerant flow.

13. The method as recited in claim 9, comprising at least one of:
shutting off coolant flow to a heater core of a coolant subsystem of the climate control system; and
turning off a blower of a ventilation subsystem of the climate control system.

14. A climate control system for an electrified vehicle configured to operate in an EV mode in which an electric machine is operated without assistance from an engine to propel the electrified vehicle and configured to operate in a non-EV mode, the system comprising:
a heat pump subsystem configured to circulate a refrigerant, said heat pump subsystem including:
a front evaporator;
a rear evaporator; and
an expansion device adapted to shut off flow of said refrigerant to said rear evaporator in response to a window defrost request during the EV mode,
wherein the window defrost request indicates that the heat pump subsystem should be operated in a dehumidification mode to defrost a window of an electrified vehicle,
a controller programmed to command said expansion device closed to shut off the flow of said refrigerant in response to said window defrost request during the EV mode.

15. The system as recited in claim 14, comprising a controller configured to control operation of said expansion device.

16. A climate control system for an electrified vehicle configured to operate in an EV mode in which an electric machine is operated without assistance from an engine to propel the electrified vehicle and configured to operate in a non-EV mode, the system, comprising:
a heat pump subsystem configured to circulate a refrigerant, said heat pump subsystem including:
a front evaporator;
a rear evaporator; and
an expansion device adapted to shut off flow of said refrigerant to said rear evaporator in response to a defrost request that indicates that the heat pump subsystem should be operated in a dehumidification mode to defrost a window of an electrified vehicle;
a coolant subsystem configured to circulate a coolant for cooling an engine, said coolant subsystem including a front heater core, a rear heater core, and a valve adapted to shut off flow of said coolant to said rear heater core in response to said defrost request; and
a controller programmed to command said expansion device and said valve closed to shut off the flow of said refrigerant and said coolant in response to said defrost request during the EV mode.

17. The system as recited in claim 16, comprising an intermediate heat exchanger adapted to effectuate heat transfer between said refrigerant and said coolant.

18. The system as recited in claim 14, comprising a ventilation subsystem including a front housing that houses said front evaporator and a rear housing that houses said rear evaporator.

19. The method as recited in claim 1, wherein turning off the refrigerant flow to the rear evaporator of the heat pump subsystem increases defrost functionality provided by the front evaporator of the heat pump subsystem for defrosting the windshield.

* * * * *